US011119777B1

(12) United States Patent
Frazier et al.

(10) Patent No.: US 11,119,777 B1
(45) Date of Patent: Sep. 14, 2021

(54) EXTENDED PREFIX INCLUDING ROUTING BIT FOR EXTENDED INSTRUCTION FORMAT

(71) Applicant: International Business Machines Corporation, Armonk, NY (US)

(72) Inventors: Giles Roger Frazier, Austin, TX (US); Hung Q. Le, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/854,964

(22) Filed: Apr. 22, 2020

(51) Int. Cl.
*G06F 9/30* (2018.01)
*G06F 9/38* (2018.01)

(52) U.S. Cl.
CPC ........ *G06F 9/30185* (2013.01); *G06F 9/3836* (2013.01)

(58) Field of Classification Search
None
See application file for complete search history.

(56) References Cited

U.S. PATENT DOCUMENTS

| 7,181,596 | B2 | 2/2007 | Henry et al. | |
| 7,380,109 | B2* | 5/2008 | Henry | G06F 9/30185 |
| | | | | 712/227 |
| 8,949,580 | B2 | 2/2015 | Li et al. | |
| 9,268,572 | B2 | 2/2016 | Gschwind et al. | |
| 9,804,852 | B2* | 10/2017 | Combs | G06F 9/30185 |
| 2007/0038984 | A1* | 2/2007 | Gschwind | G06F 8/447 |
| | | | | 717/136 |
| 2009/0172356 | A1* | 7/2009 | Valentine | G06F 9/30145 |
| | | | | 712/208 |
| 2014/0040600 | A1* | 2/2014 | Arakawa | G06F 9/382 |
| | | | | 712/205 |
| 2017/0315807 | A1* | 11/2017 | Diamond | G06F 9/30185 |

FOREIGN PATENT DOCUMENTS

WO    2017064456 A1    4/2017

OTHER PUBLICATIONS

Soman, J., & Jones, T. M. (2017). High Performance Fault Tolerance ThroughPredictive Instruction Re-Execution. 2017 IEEE International Symposium onDefect and Fault Tolerance in VLSI and Nanotechnology Systems (DFT), pp. 1-4.

* cited by examiner

*Primary Examiner* — Michael Sun
(74) *Attorney, Agent, or Firm* — Cantor Colburn LLP; Bryan Bortnick

(57) ABSTRACT

Techniques for an extended prefix including a routing bit for an extended instruction format are described herein. An aspect includes generating, by an instruction preprocessing module, a first extended instruction corresponding to an internal operation including a first routing bit. Another aspect includes generating, by the instruction preprocessing module, a second extended instruction corresponding to a prefixed instruction set architecture (ISA) instruction including a second routing bit, wherein a value of the second routing bit is opposite a value of the first routing bit. Another aspect includes providing the first extended instruction and the second extended instruction to a central processing unit (CPU). Another aspect includes, based on the value of the first routing bit, routing the internal operation directly to an execution unit of the CPU, and based on the value of the second routing bit, routing the prefixed ISA instruction to a decode/execute path of the CPU.

20 Claims, 6 Drawing Sheets

EXTENDED PREFIX INCLUDING ROUTING BIT FOR EXTENDED INSTRUCTION FORMAT

BACKGROUND

The present invention generally relates to computer systems, and more specifically, to an extended prefix including a routing bit for an extended instruction format for use in conjunction with a computer system.

The fundamental task of every computer processor is to execute computer programs. How a processor handles this task, and how computer programs must present themselves to a processor for execution, are governed by both the instruction set architecture (ISA) and the microarchitecture of the processor. An ISA is analogous to a programming model, and relates principally to how instructions in a computer program should be formatted in order to be properly decoded and executed by a processor, although an ISA may also specify other aspects of the processor, such as native data types, registers, addressing modes, memory architecture, interrupt and exception handling, and external I/O. The microarchitecture principally governs lower level details regarding how instructions are decoded and executed, including the constituent parts of the processor and how these constituent parts of the processor interconnect and intemperate to implement the processor's architectural specification.

An ISA typically includes a specification of the format of each type of instruction that is capable of being executed by a particular processor design. Typically, an instruction will be encoded to include an operational code, or opcode, that identities the type of instruction, (i.e., the type of operation to be performed when the instruction is executed), as well as one or more operands that identify input and/or output data to be processed by the instruction. In many processor designs, for example Reduced Instruction Set Computer (RISC) and other load-store designs, data is principally manipulated within a set of general purpose registers (GPR's) (often referred to as a "register file"), with load and store instructions used to respectively retrieve input data into GPR's from memory and store result or output data from GPR's and back into memory. Thus, for a majority of the instructions that manipulate data, the instructions specify one or more input or source registers from which input data is retrieved, and an output or destination register to which result data is written.

Instructions are typically defined in an ISA to be a fixed size, e.g., 32 bits or 64 bits in width. While multiple 32 or 64 bit values may be used to specify an instruction, the use of multiple values is undesirable because the multiple values take more time to propagate through the processor and significantly increase design complexity. With these fixed instruction widths, only a limited number of bits are available for use as opcodes and operands.

Each unique instruction type conventionally requires a unique opcode, so in order to support a greater number of instruction types (a continuing need in the industry), additional bits often must be allocated to the opcode portion of an instruction architecture. In some instances, opcodes may be broken into primary and secondary opcodes, with the primary opcode defining an instruction type and the secondary opcode defining a subtype for a particular instruction type; however, even when primary and secondary opcodes are used, both opcodes occupy bit positions in each instruction.

Likewise, a continuing need exists for expanding the number of registers supported by an ISA, since improvements in fabrication technology continue to enable greater numbers of registers to be architected into an integrated circuit, and in general performance improves as the number of registers increases. Each register requires a unique identifier as well, so as the number of registers increases, the number of bit positions in each instruction required to identify all supported registers likewise increases.

Therefore, a significant need continues to exist in the art for a manner of increasing the number and complexity of instructions supported by an instruction set architecture.

SUMMARY

Embodiments of the present invention are directed to an extended prefix including a routing bit for an extended instruction format. A non-limiting example computer-implemented method includes generating, by an instruction preprocessing module, a first extended instruction corresponding to an internal operation, the first extended instruction including a first routing bit. The method also includes generating, by the instruction preprocessing module, a second extended instruction corresponding to a prefixed instruction set architecture (ISA) instruction, the second extended instruction including a second routing bit, wherein a value of the second routing bit is opposite a value of the first routing bit. The method also includes providing the first extended instruction and the second extended instruction to a central processing unit (CPU). The method also includes, based on the value of the first routing bit, routing the internal operation directly to an execution unit of the CPU. The method also includes, based on the value of the second routing bit, routing the prefixed ISA instruction to a decode/execute path of the CPU.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
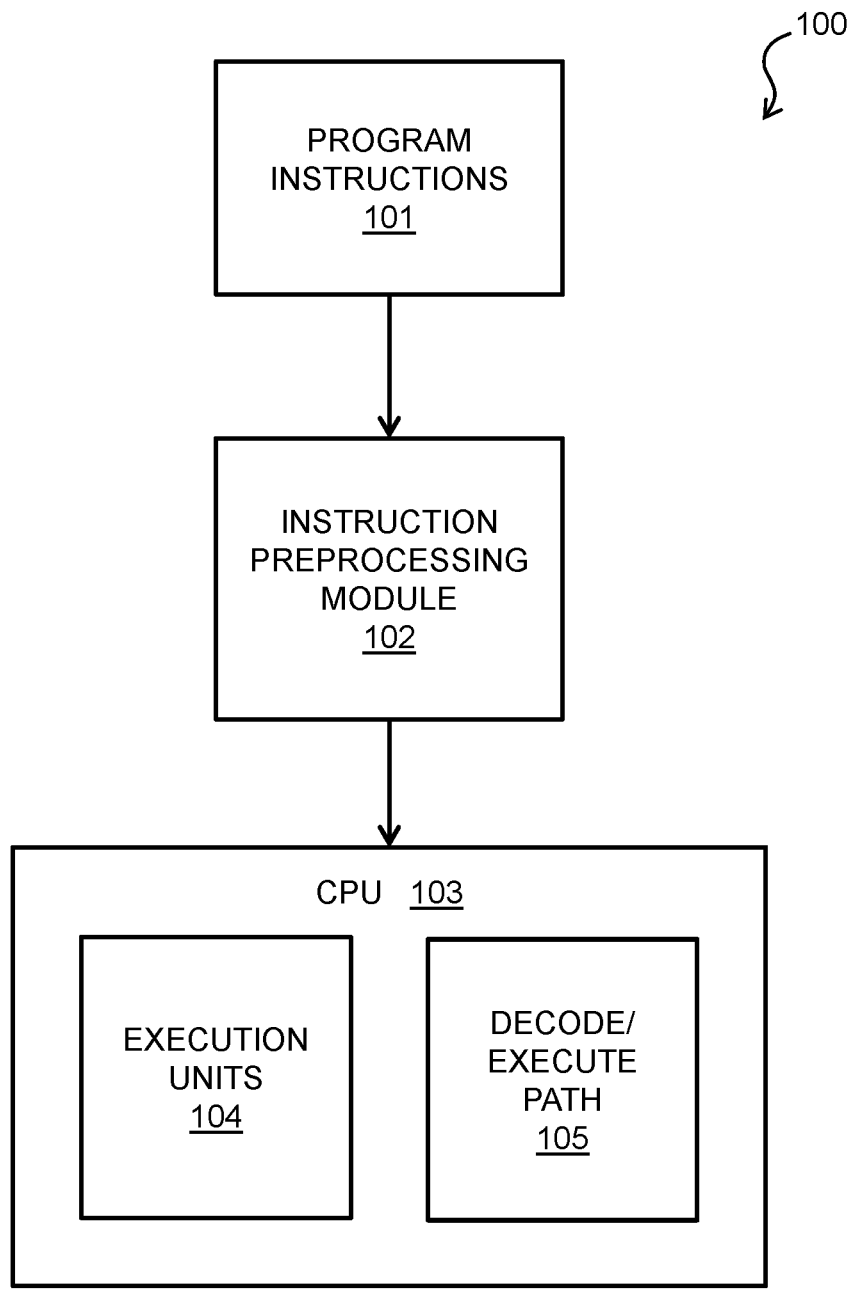
FIG. 1 is a block diagram of components of a system for an extended prefix including a routing bit for an extended instruction format in accordance with one or more embodiments of the present invention.

One or more embodiments of the present invention provide an extended prefix including a routing bit for an extended instruction format. The extended prefix enables an instruction preprocessing module, which may be implemented in software or hardware in various embodiments, to generate both internal operations, which may correspond to fused instructions, and prefixed ISA instructions. The extended prefix includes a routing bit that acts as an identifier as to whether an extended instruction is an internal operation or an ISA instruction. The routing bit may enable a processor that receives extended instructions to identify a type of each extended instruction relatively quickly. For an extended instruction comprising an internal operation, the extended instruction may be sent directly to the processor back end (e.g., to processor execution units) for execution based on the routing bit, while prefixed ISA instructions may be routed through a standard instruction decode and execution path in the processor based on the routing bit. In some embodiments, each extended instruction may include the extended prefix (including a prefix opcode, the routing bit, and an instruction prefix) and an instruction field. The instruction prefix and the instruction field in the extended instruction format may together have a same length regardless of whether the instruction prefix/instruction pair is being used to send an internal operation directly to the processor back end, or to extend the capabilities of an existing ISA instruction that is located in the instruction field.

In some embodiments, the routing bit may eliminate the need for hardware to convert program instructions into internal operations, thereby decreasing the cost and complexity of a processor. The routing bit may be implemented in processors that combine, or fuse, instructions. Such processors may convert sets (e.g., pairs or multiple instructions) of software program instructions into internal operations, i.e., each internal operation may correspond to a set of fused software program instructions. For example, in some embodiments, two program instructions that reference a same memory location or a same register may be combined into a fused instruction that is processed as an internal operation according to the extended instruction format. By enabling a software program to combine instructions and use the extended prefix to send fused instructions to the processor, use of specialized processing hardware may be avoided in the computer system in some embodiments.

In some embodiments, bits 0 to 5 of the extended prefix are the prefix opcode; the extended instruction format may be identified by the processor based on the prefix opcode. In some embodiments, the routing bit is located immediately after the opcode, e.g., in bit 6. The routing bit identifies whether the rest of the extended instruction (i.e., the instruction prefix/instruction pair) is a prefixed ISA instruction or an internal operation (e.g., a sequence of fused instructions) to be sent directly to the execution units of the processor. In some embodiments, when the routing bit is "0," it may be determined that the extended instruction is an internal operation, and when the routing bit is "1", the extended instruction may be determined to be a prefixed ISA instruction. In other embodiments, the values of the routing bit may be reversed, i.e., a routing bit of "0" may indicate a prefixed ISA instruction, and a routing bit of "1" may indicate an internal operation. The use of a single routing bit in a constant location within the extended prefix (e.g., bit 6) enables hardware to relatively quickly distinguish internal operations from prefixed ISA instructions without any further decoding. Specifying a same length for all instruction prefix/instruction pairs in the extended instruction format enables a common set of hardware registers to be used for instruction routing regardless of what type of instruction is being processed.

Turning now to FIG. 1, system 100 for use in conjunction with an extended prefix including a routing bit for an extended instruction format is generally shown in accordance with one or more embodiments of the present invention. System 100 may be implemented in conjunction with any appropriate computer system, such as computer system 500 of FIG. 5. System 100 includes program instructions 101 that are received by an instruction preprocessing module 102. In some embodiments, the program instructions 101 may be generated by software that is executing on the computer system corresponding to system 100. The program instructions 101 may be provided to the instruction preprocessing module 102 in any appropriate manner. In some embodiments, the program instructions 101 may be provided to instruction preprocessing module 102 by loading a group of instructions into a memory location that may be accessed by the instruction preprocessing module 102. In some embodiments, the instruction preprocessing module 102 may monitor a data stream of the computer system to identify the program instructions 101. In some embodiments, the program instructions 101 may include ISA instructions, and may be 32 bit instructions.

Instruction preprocessing module 102 generates extended instructions corresponding to the extended instruction format, each including an extended prefix including a routing bit, based on the program instructions 101. In some embodiments, the extended instructions may be 64 bit instructions. Generation of the extended instructions by instruction preprocessing module 102 is discussed in further detail below with respect to FIG. 2A. Instruction preprocessing module 102 may be a software module or a hardware module in various embodiments. The extended instructions are provided from instruction preprocessing module 102 to central processing unit (CPU) 103, and the extended instructions are routed either directly to execution units 104, or to decode/execute path 105 based on the respective routing bits in the extended prefixes. Processing of the extended instructions by the CPU 103 is discussed in further detail below with respect to FIG. 2B. The execution units 104 may include any appropriate hardware modules of the CPU 103, including but not limited to an arithmetic execution unit, a fixed point execution unit, a vector execution unit, a floating point execution unit, a branch instruction execution unit, a load/store execution unit, an input/output (I/O) execution unit, and any other specialized execution units (e.g., units configured for machine learning processing or signal processing).

It is to be understood that the block diagram of FIG. 1 is not intended to indicate that the system 100 is to include all of the components shown in FIG. 1. Rather, the system 100 can include any appropriate fewer or additional components not illustrated in FIG. 1 (e.g., additional memory components, embedded controllers, functional blocks, connections between functional blocks, modules, inputs, outputs, etc.). Further, the embodiments described herein with respect to system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2A:
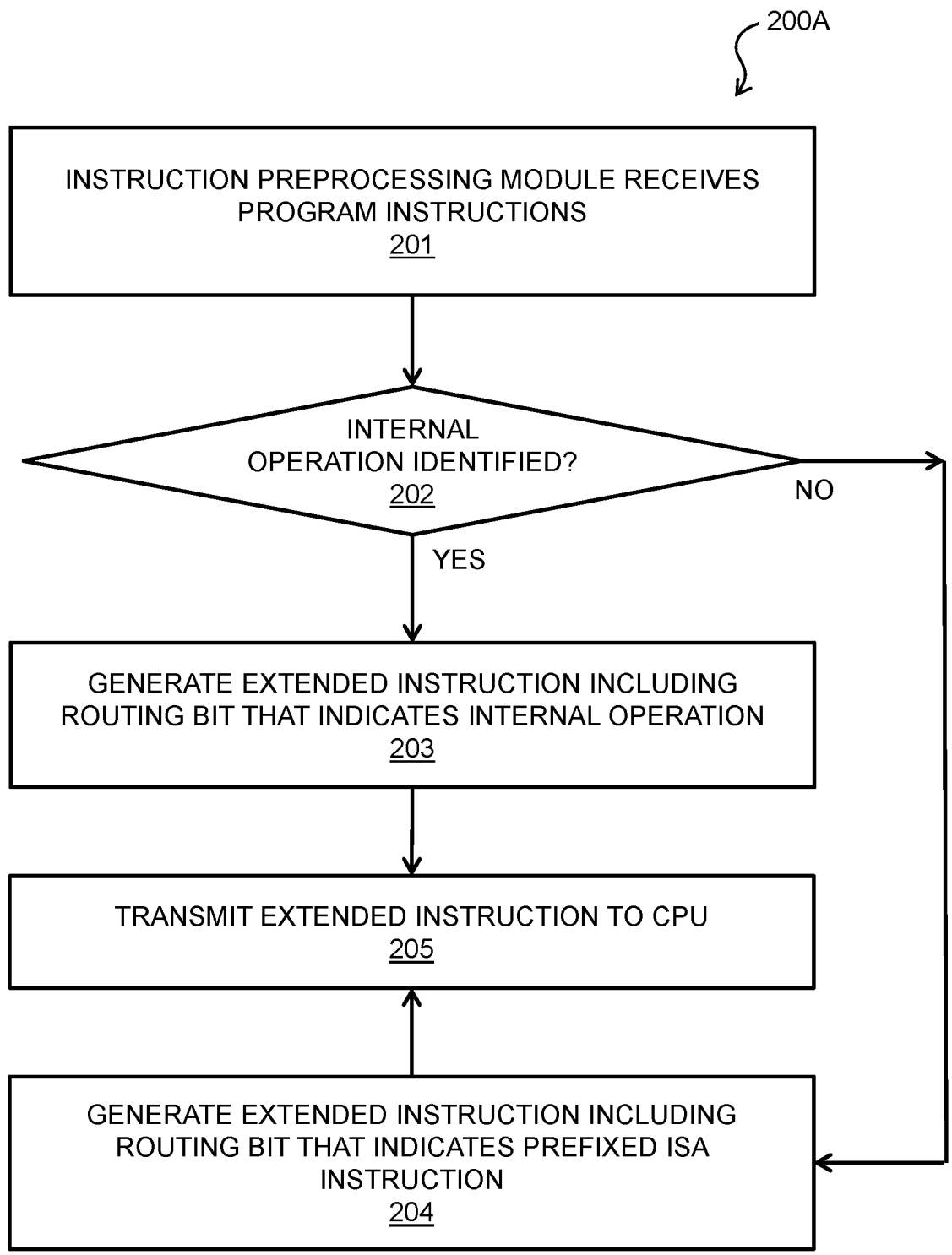
FIG. 2A is a flow diagram of a process for generating an extended instruction with an extended prefix including a routing bit in accordance with one or more embodiments of the present invention.

FIG. 2A shows a process flow diagram of a method 200A for generating an extended instruction with an extended prefix including a routing bit in accordance with one or more embodiments of the present invention. Embodiments of method 200A may be implemented in instruction preprocessing module 102 of system 100 of FIG. 1. In block 201, an instruction preprocessing module receives program instructions, such as program instructions 101 of FIG. 1. The program instructions may be received by the instruction preprocessing module in any appropriate manner in block 201. In some embodiments, the program instructions may be provided to instruction preprocessing module in block 201 by loading a group of instructions into a memory location that may be accessed by the instruction preprocessing module. In some embodiments, the instruction preprocessing module may monitor a data stream of the computer system to identify the program instructions in block 201. In various embodiments, the program instructions received in block 201 may be 32 bit instructions, 64 bit instructions, or combinations of 32 and 64 bit instructions.

In block 202, the instruction preprocessing module determines, for one or more received instructions, whether an internal operation is identified. The internal operation may correspond to two or more program instructions of the received program instructions in some embodiments. For example, in some embodiments, two program instructions that reference a same memory location or a same register may be combined into a fused instruction that is processed as an internal operation according to the extended instruction format. In some embodiments, the operations performed by a block of program instructions may be condensed into a single internal operation according to the extended instruction format. The determination of block 202 may be made based on any appropriate criteria. If it is determined in block 202 that program instructions corresponding to an internal operation are identified, flow proceeds from block 202 to block 203, and the instruction preprocessing module generates an extended instruction corresponding to the identified program instructions with an extended prefix that includes a routing bit that indicates that the extended instruction is an internal operation. For example, in some embodiments of block 203, the routing bit in the extended prefix may be set to "1". In other embodiments, the routing bit in the extended prefix may be set to "0". The extended instruction generated in block 203 may correspond to a fused instruction in some embodiments. In some embodiments, the extended prefix may include a prefix opcode that is located at the beginning of the extended instruction, and the routing bit may be located directly after the prefix opcode. In some embodiments, the extended instruction of block 203 are 64 bit instructions. In some embodiments, the instruction prefix bits in the extended prefix of the extended instruction corresponding to the internal operation may include identifiers of one or more registers or memory locations for use by the internal operation. The extended instruction of block 203 is then transmitted to the CPU in block 205.

If it was determined in block 202 a received program instruction is not an internal operation, flow proceeds from block 202 to block 204. In block 204, an extended instruction is generated based on the program instruction that was identified as not being an internal operation. The extended instruction that is generated in block 204 includes an extended prefix including a routing bit that is set to an opposite value of the routing bit value of block 203. For example, if the routing bit of an internal operation is set to "0" in block 203, the routing bit of the extended instruction of block 204 is set to "1"; and if the routing bit of an internal operation is set to "1" in block 203, the routing bit of the extended instruction of block 204 is set to "0". In some embodiments, the extended prefix may include a prefix opcode that is located at a beginning of the extended instruction, and the routing bit may be located directly after the prefix opcode. In some embodiments, the extended instruction of block 204 may be a 64 bit instruction. The extended instruction of block 204 is then transmitted to the CPU in block 205. Block 202, either block 203 or block 204, and block 205 of method 200A may be repeated such that each program instruction that is received by the instruction preprocessing module is converted into the extended instruction format for transmission to the CPU. An example of an extended instruction format that may be generated according to blocks 203 and 204 of method 200A are discussed in further detail below with respect to FIGS. 3 and 4.

The process flow diagram of FIG. 2A is not intended to indicate that the operations of the method 200A are to be executed in any particular order, or that all of the operations of the method 200A are to be included in every case. Additionally, the method 200A can include any suitable number of additional operations.

Figure 2B:
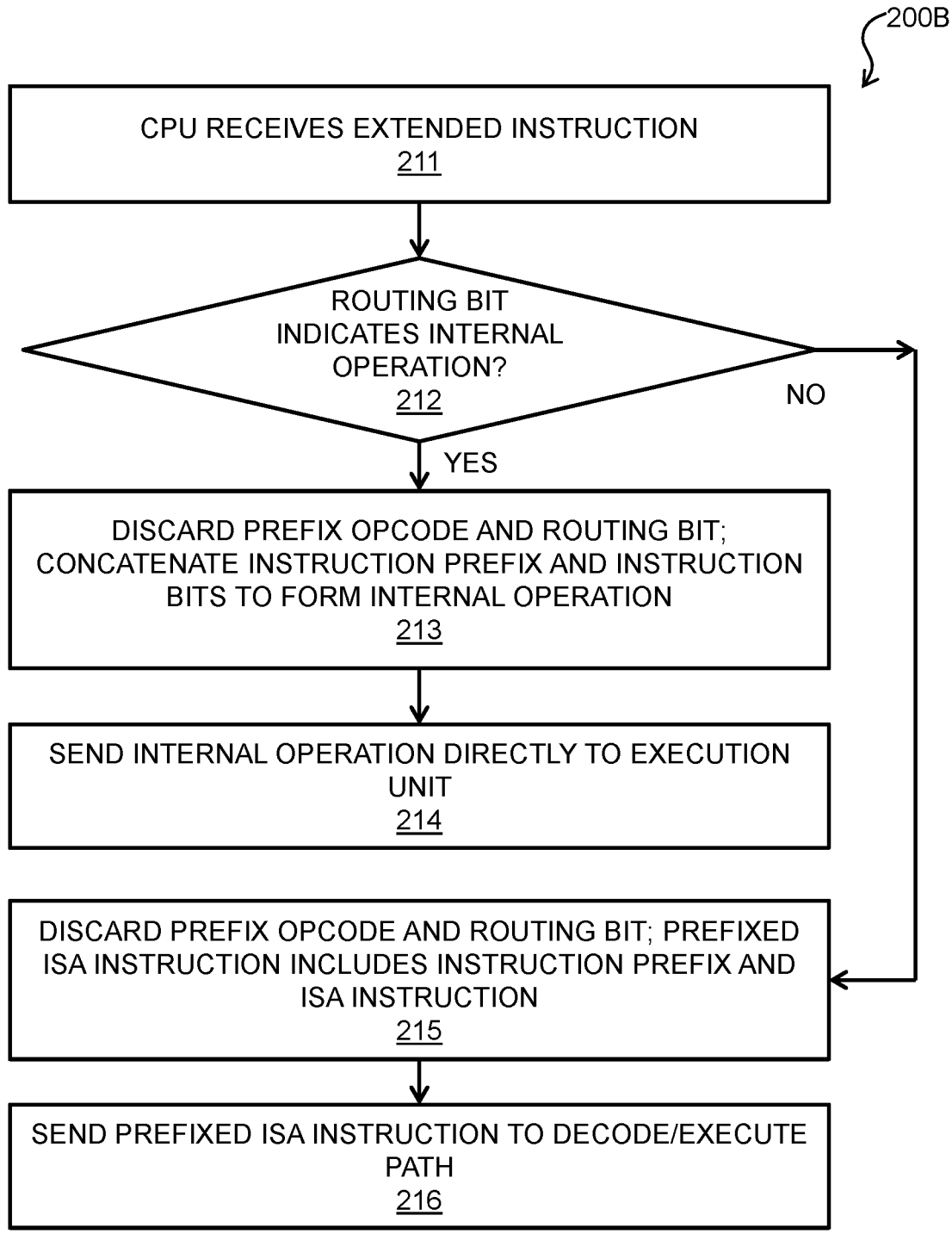
FIG. 2B is a flow diagram of a process for processing an extended instruction with an extended prefix including a routing bit in accordance with one or more embodiments of the present invention.

FIG. 2B shows a process flow diagram of a method 200B for processing an extended instruction with an extended prefix including a routing bit in accordance with one or more embodiments of the present invention. Embodiments of method 200B may be implemented in CPU 103 of system 100 of FIG. 1. In block 211 of method 200B, the CPU receives an extended instruction from an instruction preprocessing module. The extended instruction may be received by the CPU in any appropriate manner in block 211. In some embodiments, the extended instruction may be identified by the CPU in block 211 based on a prefix opcode that is located at the beginning of the extended instruction. In block 212, the CPU determines whether the routing bit in the extended prefix indicates that the extended instruction is an internal operation. For example, in some embodiments, a routing bit having a value of "0" may indicate that the extended instruction is an internal operation. In other embodiments, a routing bit having a value of "1" may indicate that the extended instruction is an internal operation.

If it is determined in block 212 that the routing bit in the extended prefix indicates that the extended instruction is an internal operation, flow proceeds from block 212 to block 213. In block 213, the prefix opcode and routing bit of the extended instruction are discarded, and remaining instruction prefix and instruction bits are concatenated to form the internal operation. In some embodiments, the internal operation of block 213 are 57 bits. In some embodiments, the instruction prefix bits in the internal operation may include identifiers of one or more registers or memory locations for use by the internal operation. The internal operation is then routed directly to an execution unit of the CPU based on the value of the routing bit in block 214. The execution unit that receives the internal operation in block 214 may include, but is not limited to, an arithmetic execution unit, a fixed point execution unit, a vector execution unit, a floating point execution unit, a branch instruction execution unit, a load/store execution unit, an I/O execution unit, or any other specialized execution unit (e.g., a unit configured for machine learning processing or signal processing) in a back end of the CPU.

If it was determined in block 212 that the routing bit in the extended prefix indicates that the extended instruction is not an internal operation, flow proceeds from block 212 to block 215. In block 215, the prefix opcode and routing bit of the extended instruction are discarded, and the remaining instruction prefix and ISA instruction bits form a prefixed ISA instruction. In some embodiments, the prefixed ISA instruction of block 215 are 57 bits. The prefixed ISA instruction is then routed to a decode/execute path of the CPU for processing based on the value of the routing bit in block 216. Embodiments of method 200B may be repeated for each extended instruction that is received by the CPU. Examples of internal operations and prefixed ISA instructions that may be generated according to method 200B are illustrated with respect to FIGS. 3 and 4.

The process flow diagram of FIG. 2B is not intended to indicate that the operations of the method 200B are to be executed in any particular order, or that all of the operations of the method 200B are to be included in every case. Additionally, the method 200B can include any suitable number of additional operations.

Figure 3:
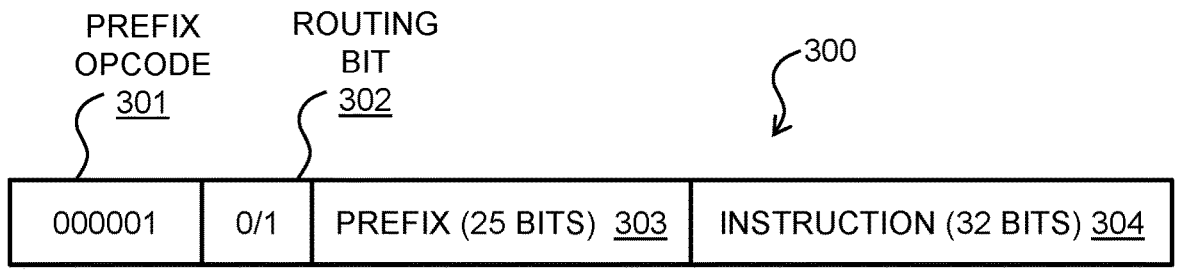
FIG. 3 is a block diagram of an extended instruction format with an extended prefix including a routing bit in accordance with one or more embodiments of the present invention.

FIG. 3 shows an extended instruction format 300 with an extended prefix including a routing bit in accordance with one or more embodiments of the present invention. The extended instruction format 300 is 64 bits, and includes an extended prefix (including prefix opcode 301, a routing bit 302, and instruction prefix 303) and instruction bits 304. In some embodiments, the prefix opcode 301 may be a first 6 bits (i.e., bits 0:5) of the extended instruction format 300, and may have a value of "000001" in some embodiments. The routing bit 302 is a single bit having a value of either "0" or "1", and may be located directly after the prefix opcode 301 in bit 6 of the extended instruction format 300 in some embodiments. The instruction prefix 303 may be 25 bits in some embodiments, and the instruction bits 304 may be 32 bits in some embodiments. Extended instructions corresponding to extended instruction format 300 may be generated in blocks 203 and 204 of method 200A of FIG. 2A.

As illustrated in FIG. 3, based on the routing bit 302 being equal to "0", the CPU may determine, according to block 213 of method 200B of FIG. 2B, that an extended instruction according to extended instruction format 300 is an internal operation 305 including 57 bits (i.e., the concatenated bits of instruction prefix 303 and instruction bits 304). In some embodiments, the bits of instruction prefix 303 that are included in the internal operation 305 may include identifiers of one or more registers or memory locations for use by the internal operation 305. Further, as illustrated in FIG. 3, based on the routing bit 302 being equal to "0", the CPU may generate, according to block 215 of method 200B of FIG. 2B a prefixed ISA instruction 306 including 57 bits, including the bits from instruction prefix 303 and instruction bits 304 of the extended instruction format 300. The prefix 307 may include additional information that extends the capability of the ISA instruction 308 in the prefixed ISA instruction 306.

FIG. 3 is shown for illustrative purposes only. For example, in some embodiments of an extended instruction format as illustrated in FIG. 3, a routing bit equal to "1" may indicate an internal operation, and a routing bit equal to "0" may indicate a prefixed ISA instruction. Further, embodiments of the prefix opcode may have any appropriate number of bits having any appropriate value in various embodiments, and the routing bit may have any appropriate location in various embodiments. Further, embodiments of an extended instruction format as illustrated in FIG. 3 may include any appropriate number of fields, each field having any appropriate number of bits having any appropriate value.

Figure 4:
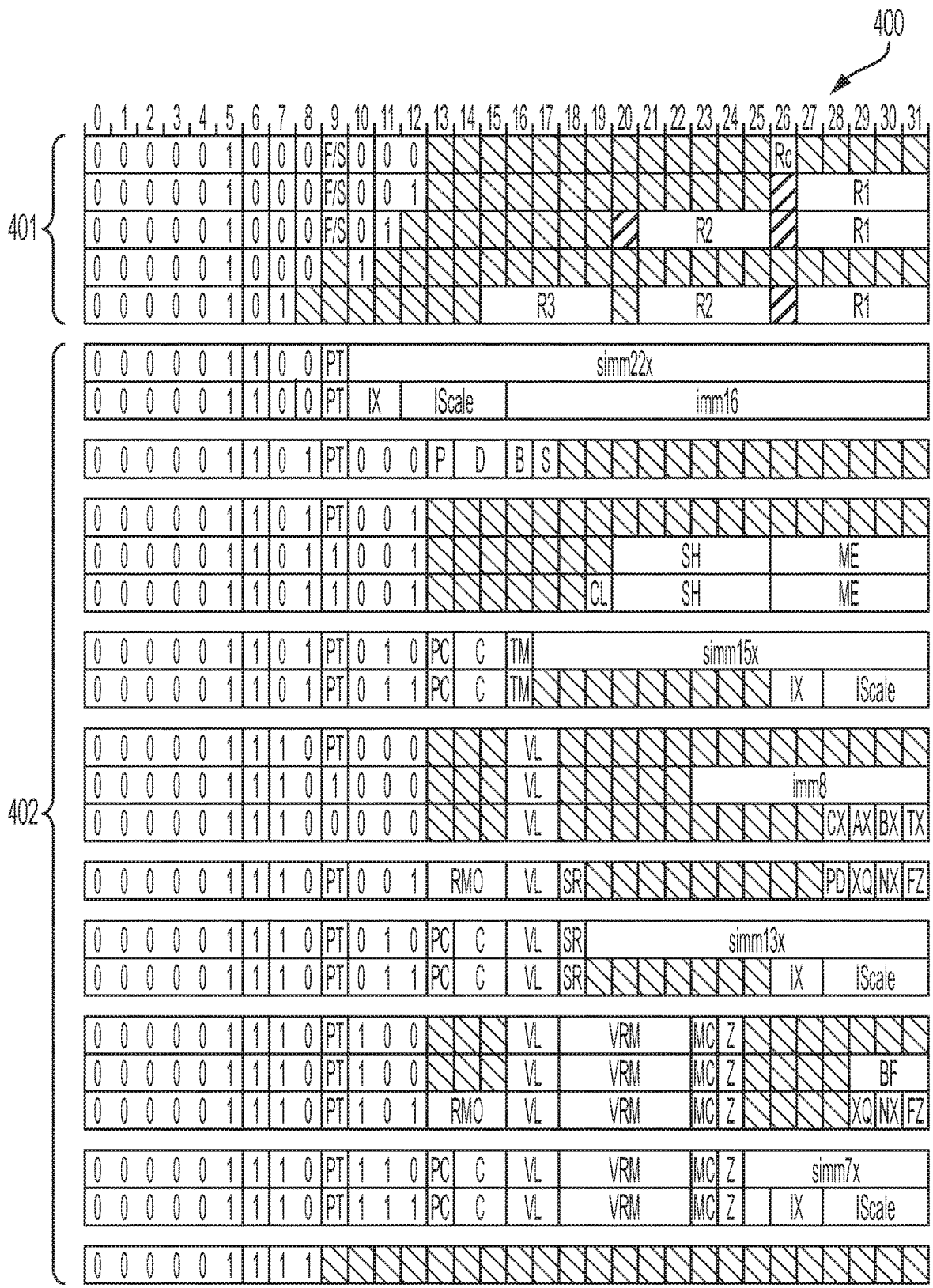
FIG. 4 is a block diagram of extended prefixes including routing bits for an extended instruction format in accordance with one or more embodiments of the present invention.

FIG. 4 illustrates extended prefixes 400 including routing bits for an extended instruction format in accordance with one or more embodiments of the present invention. As shown in FIG. 4, extended prefixes 400 correspond to internal operations 401, including a routing bit (i.e., bit 6) value of "0", and ISA instruction prefixes 402, including a routing bit value of "1". Each of extended prefixes 400, as illustrated in the embodiments of FIG. 4, includes a 6 bit prefix opcode of "000001" in bits 0 to 5. The instruction prefix bits in the internal operations 401 may include register identifiers (e.g., R1, R2, and R3) corresponding to data for use by the internal operations 401. The ISA instruction prefixes 402 include prefixes for ISA instructions (not shown) in the 25 bits located directly after the routing bit; the instruction prefix bits may be used to extend the capabilities of associated ISA instructions.

FIG. 4 is shown for illustrative purposes only. For example, in some embodiments of an extended prefix for an extended instruction format as illustrated in FIG. 4, a routing bit equal to "1" may indicate an internal operation, and a routing bit equal to "0" may indicate a prefixed ISA instruction. Further, embodiments of the prefix opcode may have any appropriate number of bits having any appropriate value in various embodiments, and the routing bit may have any appropriate location in various embodiments. Further, embodiments of an extended prefix for an extended instruction format as illustrated in FIG. 4 may include any appropriate number of fields, each field having any appropriate number of bits having any appropriate value.

Figure 5:
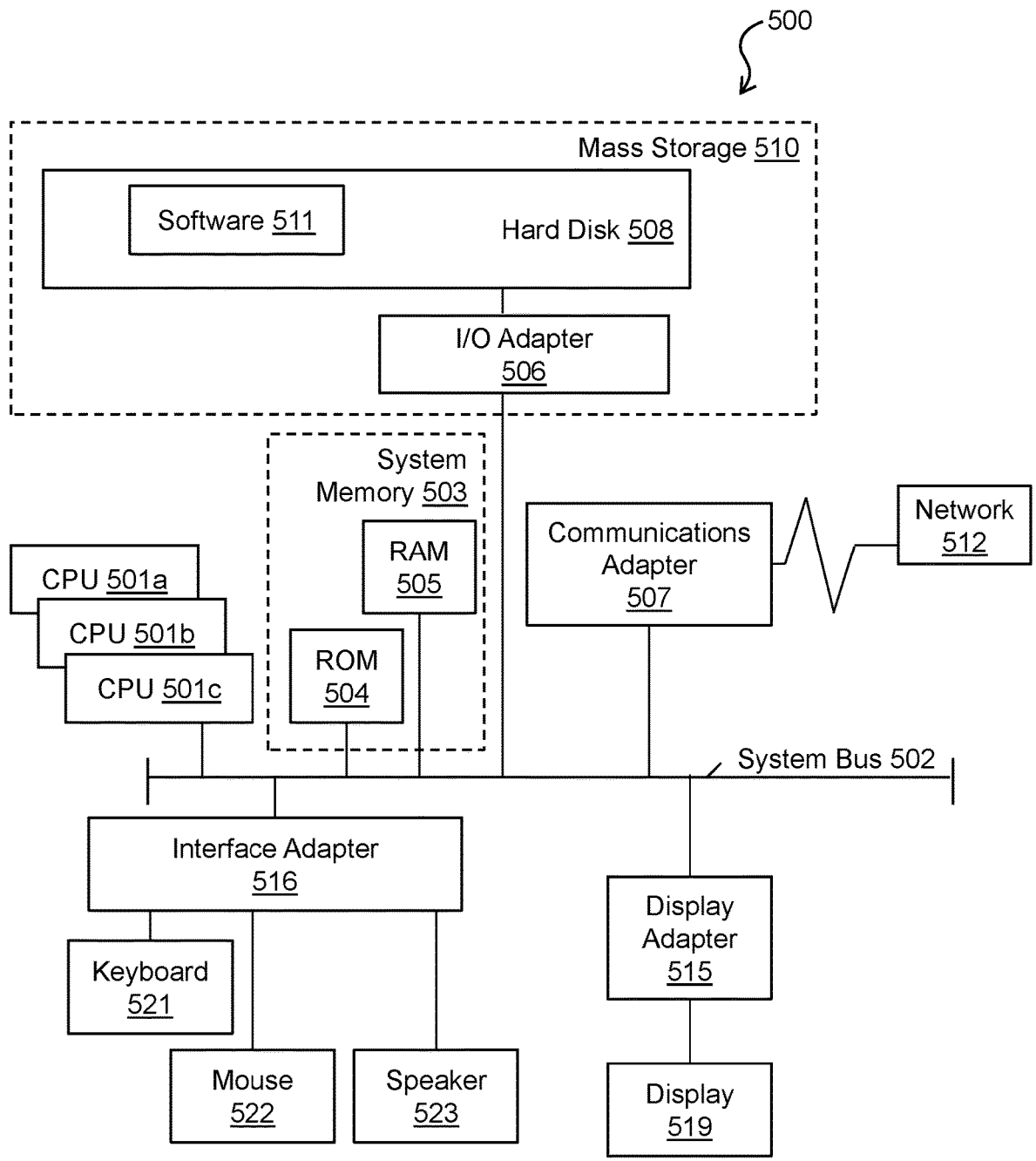
FIG. 5 is a block diagram of an example computer system for use in conjunction with one or more embodiments of an extended prefix including a routing bit for an extended instruction format.

Turning now to FIG. 5, a computer system 500 is generally shown in accordance with an embodiment. The computer system 500 can be an electronic, computer framework comprising and/or employing any number and combination of computing devices and networks utilizing various communication technologies, as described herein. The computer system 500 can be easily scalable, extensible, and modular, with the ability to change to different services or reconfigure some features independently of others. The computer system 500 may be, for example, a server, desktop computer, laptop computer, tablet computer, or smartphone. In some examples, computer system 500 may be a cloud computing node. Computer system 500 may be described in the general context of computer system executable instructions, such as program modules, being executed by a computer system. Generally, program modules may include routines, programs, objects, components, logic, data structures, and so on that perform particular tasks or implement particular abstract data types. Computer system 500 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, the computer system 500 has one or more central processing units (CPU(s)) 501a, 501b, 501c, etc. (collectively or generically referred to as processor(s) 501). The processors 501 can be a single-core processor, multi-core processor, computing cluster, or any number of other configurations. The processors 501, also referred to as processing circuits, are coupled via a system bus 502 to a system memory 503 and various other components. The system memory 503 can include a read only memory (ROM) 504 and a random access memory (RAM) 505. The ROM 504 is coupled to the system bus 502 and may include a basic input/output system (BIOS), which controls certain basic functions of the computer system 500. The RAM is read-write memory coupled to the system bus 502 for use by the processors 501. The system memory 503 provides temporary memory space for operations of said instructions during operation. The system memory 503 can include random access memory (RAM), read only memory, flash memory, or any other suitable memory systems.

The computer system 500 comprises an input/output (I/O) adapter 506 and a communications adapter 507 coupled to the system bus 502. The I/O adapter 506 may be a small computer system interface (SCSI) adapter that communicates with a hard disk 508 and/or any other similar component. The I/O adapter 506 and the hard disk 508 are collectively referred to herein as a mass storage 510.

Software 511 for execution on the computer system 500 may be stored in the mass storage 510. The mass storage 510 is an example of a tangible storage medium readable by the processors 501, where the software 511 is stored as instructions for execution by the processors 501 to cause the computer system 500 to operate, such as is described herein below with respect to the various Figures. Examples of computer program product and the execution of such instruction is discussed herein in more detail. The communications adapter 507 interconnects the system bus 502 with a network 512, which may be an outside network, enabling the computer system 500 to communicate with other such systems. In one embodiment, a portion of the system memory 503 and the mass storage 510 collectively store an operating system, which may be any appropriate operating system, such as the z/OS or AIX operating system from IBM Corporation, to coordinate the functions of the various components shown in FIG. 5.

Additional input/output devices are shown as connected to the system bus 502 via a display adapter 515 and an interface adapter 516 and. In one embodiment, the adapters 506, 507, 515, and 516 may be connected to one or more I/O buses that are connected to the system bus 502 via an intermediate bus bridge (not shown). A display 519 (e.g., a screen or a display monitor) is connected to the system bus 502 by a display adapter 515, which may include a graphics controller to improve the performance of graphics intensive applications and a video controller. A keyboard 521, a mouse 522, a speaker 523, etc. can be interconnected to the system bus 502 via the interface adapter 516, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 5, the computer system 500 includes processing capability in the form of the processors 501, and, storage capability including the system memory 503 and the mass storage 510, input means such as the keyboard 521 and the mouse 522, and output capability including the speaker 523 and the display 519.

In some embodiments, the communications adapter 507 can transmit data using any suitable interface or protocol, such as the internet small computer system interface, among others. The network 512 may be a cellular network, a radio network, a wide area network (WAN), a local area network (LAN), or the Internet, among others. An external computing device may connect to the computer system 500 through the network 512. In some examples, an external computing device may be an external webserver or a cloud computing node.

It is to be understood that the block diagram of FIG. 5 is not intended to indicate that the computer system 500 is to include all of the components shown in FIG. 5. Rather, the computer system 500 can include any appropriate fewer or additional components not illustrated in FIG. 5 (e.g., additional memory components, embedded controllers, modules, additional network interfaces, etc.). Further, the embodiments described herein with respect to computer system 500 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   generating, by an instruction preprocessing module, a first extended instruction corresponding to an internal operation, the first extended instruction comprising a first routing bit;
   generating, by the instruction preprocessing module, a second extended instruction corresponding to a prefixed instruction set architecture (ISA) instruction, the second extended instruction comprising a second routing bit, wherein a value of the second routing bit is opposite a value of the first routing bit;
   providing the first extended instruction and the second extended instruction to a central processing unit (CPU);
   based on the value of the first routing bit, routing the internal operation directly to an execution unit of the CPU; and
   based on the value of the second routing bit, routing the prefixed ISA instruction to a decode/execute path of the CPU.

2. The method of claim 1, wherein the execution unit comprises one of an arithmetic execution unit, a fixed point execution unit, a vector execution unit, a floating point execution unit, a branch instruction execution unit, a load/store execution unit, and an input/output (I/O) execution unit.

3. The method of claim 1, wherein generating the first extended instruction by the instruction preprocessing module comprises:
   receiving a plurality of program instructions;
   identifying at least two program instructions corresponding to the internal operation in the plurality of program instructions;
   fusing the at least two program instructions to generate the first extended instruction; and
   setting the first routing bit in the first extended instruction to indicate the internal operation.

4. The method of claim 3, wherein the at least two program instructions each reference a same register, and wherein first extended instruction comprises the reference to the register.

5. The method of claim 1, wherein generating the second extended instruction by the instruction preprocessing module comprises:
   receiving a plurality of program instructions;
   identifying a program instruction corresponding to the prefixed ISA instruction in the plurality of program instructions; and
   generating the second extended instruction based on the identified program instruction; and
   setting the second routing bit to indicate the prefixed ISA instruction.

6. The method of claim 1, wherein the first extended instruction and the second extended instruction each correspond to an extended instruction format, the extended instruction format comprising:
   a prefix opcode located at a beginning of the extended instruction format, the prefix opcode comprising 6 bits;
   a routing bit located directly after the prefix opcode;
   an instruction prefix located directly after the routing bit, the instruction prefix comprising 25 bits; and
   instruction bits locate directly after the instruction prefix, the instruction bits comprising 32 bits.

7. The method of claim 6, wherein routing the internal operation directly to the execution unit of the CPU comprises:
   discarding the prefix opcode and the first routing bit; and concatenating the instruction prefix and the instruction bits to form the internal operation; and wherein routing the prefixed ISA instruction to the decode/execute path of the CPU comprises:

discarding the prefix opcode and the second routing bit; and providing the instruction prefix and the instruction bits to the decode/execute path of the CPU.

8. A system comprising:

a memory having computer readable instructions; and one or more processors for executing the computer readable instructions, the computer readable instructions controlling the one or more processors to perform operations comprising:

generating, by an instruction preprocessing module, a first extended instruction corresponding to an internal operation, the first extended instruction comprising a first routing bit;

generating, by the instruction preprocessing module, a second extended instruction corresponding to a prefixed instruction set architecture (ISA) instruction, the second extended instruction comprising a second routing bit, wherein a value of the second routing bit is opposite a value of the first routing bit;

providing the first extended instruction and the second extended instruction to a central processing unit (CPU);

based on the value of the first routing bit, routing the internal operation directly to an execution unit of the CPU; and based on the value of the second routing bit, routing the prefixed ISA instruction to a decode/execute path of the CPU.

9. The system of claim 8, wherein the execution unit comprises one of an arithmetic execution unit, a fixed point execution unit, a vector execution unit, a floating point execution unit, a branch instruction execution unit, a load/store execution unit, and an input/output (I/O) execution unit.

10. The system of claim 8, wherein generating the first extended instruction by the instruction preprocessing module comprises:

receiving a plurality of program instructions;

identifying at least two program instructions corresponding to the internal operation in the plurality of program instructions;

fusing the at least two program instructions to generate the first extended instruction; and setting the first routing bit in the first extended instruction to indicate the internal operation.

11. The system of claim 10, wherein the at least two program instructions each reference a same register, and wherein first extended instruction comprises the reference to the register.

12. The system of claim 8, wherein generating the second extended instruction by the instruction preprocessing module comprises:

receiving a plurality of program instructions;

identifying a program instruction corresponding to the prefixed ISA instruction in the plurality of program instructions; and generating the second extended instruction based on the identified program instruction; and setting the second routing bit to indicate the prefixed ISA instruction.

13. The system of claim 8, wherein the first extended instruction and the second extended instruction each correspond to an extended instruction format, the extended instruction format comprising:

a prefix opcode located at a beginning of the extended instruction format, the prefix opcode comprising 6 bits;

a routing bit located directly after the prefix opcode;

an instruction prefix located directly after the routing bit, the instruction prefix comprising 25 bits; and instruction bits locate directly after the instruction prefix, the instruction bits comprising 32 bits.

14. The system of claim 13, wherein routing the internal operation directly to the execution unit of the CPU comprises:

discarding the prefix opcode and the first routing bit; and concatenating the instruction prefix and the instruction bits to form the internal operation; and wherein routing the prefixed ISA instruction to the decode/execute path of the CPU comprises:

discarding the prefix opcode and the second routing bit; and providing the instruction prefix and the instruction bits to the decode/execute path of the CPU.

15. A computer program product comprising a computer readable storage medium having program instructions embodied therewith, the program instructions executable by one or more processors to cause the one or more processors to perform operations comprising:

generating, by an instruction preprocessing module, a first extended instruction corresponding to an internal operation, the first extended instruction comprising a first routing bit;

generating, by the instruction preprocessing module, a second extended instruction corresponding to a prefixed instruction set architecture (ISA) instruction, the second extended instruction comprising a second routing bit, wherein a value of the second routing bit is opposite a value of the first routing bit;

providing the first extended instruction and the second extended instruction to a central processing unit (CPU);

based on the value of the first routing bit, routing the internal operation directly to an execution unit of the CPU; and based on the value of the second routing bit, routing the prefixed ISA instruction to a decode/execute path of the CPU.

16. The computer program product of claim 15, wherein the execution unit comprises one of an arithmetic execution unit, a fixed point execution unit, a vector execution unit, a floating point execution unit, a branch instruction execution unit, a load/store execution unit, and an input/output (I/O) execution unit.

17. The computer program product of claim 15, wherein generating the first extended instruction by the instruction preprocessing module comprises:

receiving a plurality of program instructions;

identifying at least two program instructions corresponding to the internal operation in the plurality of program instructions;

fusing the at least two program instructions to generate the first extended instruction; and setting the first routing bit in the first extended instruction to indicate the internal operation.

18. The computer program product of claim 17, wherein the at least two program instructions each reference a same register, and wherein first extended instruction comprises the reference to the register.

19. The computer program product of claim 15, wherein generating the second extended instruction by the instruction preprocessing module comprises:
- receiving a plurality of program instructions;
- identifying a program instruction corresponding to the prefixed ISA instruction in the plurality of program instructions; and
- generating the second extended instruction based on the identified program instruction; and
- setting the second routing bit to indicate the prefixed ISA instruction.

20. The computer program product of claim 15, wherein the first extended instruction and the second extended instruction each correspond to an extended instruction format, the extended instruction format comprising:
- a prefix opcode located at a beginning of the extended instruction format, the prefix opcode comprising 6 bits;
- a routing bit located directly after the prefix opcode;
- an instruction prefix located directly after the routing bit, the instruction prefix comprising 25 bits; and
- instruction bits locate directly after the instruction prefix, the instruction bits comprising 32 bits.

* * * * *